Jan. 30, 1973 H. P. KIRCHNER ET AL 3,713,877
METHOD OF STRENGTHENING CERAMIC BODIES AND STRENGTHENED CERAMIC BODIES PRODUCED THEREBY
Filed Feb. 10, 1969 12 Sheets-Sheet 1

INVENTORS
HENRY P. KIRCHNER,
RALPH E. WALKER, AND
ROBERT M. GRUVER

BY Wenderoth, Lind and Ponack

ATTORNEYS

TABLE I

Flexural Strength of Zirconia with Destabilized Surface Layers
(Zirconia "R" fired at 1650°C, one hour)

| Example No. | Treatment | Treatment Conditions | | No. Samples | Flexural Strength Data | |
|---|---|---|---|---|---|---|
| | | Temp. °C. | Time Hours | | Average Strength psi | Strength Difference psi |
| | As cut controls | - | - | 4 | 19,400 (1) | - |
| | Refired controls | 900-1000 | 18 | 3 | 25,200 (1) (3) | + 5,800 |
| 9 | Packed in 600-mesh SiC | 900-1000 | 18 | 3 | 24,200 (1) (3) | + 4,800 |
| | Refired controls | 1150 | 4 | 4 | 19,500 (2) | - |
| 10 | Packed in 600-mesh SiC | 1150 | 4 | 3 | 23,200 (2) (3) | - |
| | As cut controls | - | - | 4 | 17,700 (2) | - |
| | Refired controls | 1200 | 4 | 4 | 19,900 (2) | + 2,200 |
| 11 | Packed in 600-mesh SiC | 1200 | 4 | 4 | 21,200 (2) | + 3,500 |
| | As cut controls | - | - | 2 | 16,900 (2) | - |
| | Refired controls | 1400 | 4 | 4 | 17,700 (2) | + 800 |
| 12 | Packed in 600-mesh SiC | 1400 | 4 | 4 | 18,600 (2) | + 1,700 |
| | Refired controls | 1500 | 1 | 4 | 19,200 (2) | - |
| 13 | Packed in 600-mesh SiC | 1500 | 1 | 2 | 16,600 (2) | - |
| 14 | Unfired bars packed in 600-mesh SiC | 1650 | 1 | 3 | 10,700 (2) | - |
| | Refired controls | 1300 | 4 | 4 | 20,200 (2) | - |
| 15 | Packed in 600-mesh SiC | 1300 | 4 | 4 | 24,300 (2) | - |
| | As cut controls | - | - | 4 | 20,600 (2) | - |
| | Refired controls | 1300 | 8 | 3 | 23,200 (2) | + 2,600 |
| 16 | Packed in 600-mesh SiC | 1300 | 8 | 4 | 26,200 (2) | + 5,600 |
| 17 | Packed in 120-mesh SiC | 1300 | 8 | 2 | 29,300 (2) | + 8,700 |
| | As cut controls | - | - | 4 | 22,800 (2) | - |
| | Refired controls | 1300 | 19 | 4 | 16,700 (2) | - 6,100 |
| 18 | Packed in 600-mesh SiC | 1300 | 19 | 3 | 4,900 (2) | -17,900 |

Notes
(1) Three-point loading on a one-half inch span
(2) Three-point loading on a one-inch span
(3) One low value omitted in calculating the average INVENTORS
HENRY P. KIRCHNER,
RALPH E. WALKER and
ROBERT M. GRUVER BY Wenderoth, Lind & Ponack

ATTORNEY

TABLE II

Residual Stresses in Zirconia Bars
(Packed in 600-Mesh SiC,
Refired at 1300°C for 8 Hours)

| | Original Sample Thickness | Thickness After Slotting 1-1/4" | Change |
|---|---|---|---|
| Sample #1 | .084" | .072" | - .012" |
| Sample #2 | .086" | .075" | - .011" |

TABLE III

Rod Test Results for ALSIMAG #614
Alumina Packed in $CaCO_3$
(0.125" diameter rods, refired
at 1350°C for four hours)

| Sample No. | Slot Dimensions | Change in Diameter Treated Samples | Controls |
|---|---|---|---|
| 1 | 0.043" wide x 1.1" long | -0.0012" | + 0.0011 |
| 2 | 0.043" wide x 1.1" long | -0.0010" | - |
| 3 | Two slots (1) 0.012"x0.8" | -0.0005" | - |
| 4 | Two slots (1) 0.012"x0.8" | -0.0010" | - |
| 5 | Two slots (1) 0.012"x0.8" | -0.0014" | - |

HENRY P. KIRCHNER
RALPH E. WALKER, &
ROBERT M. GRUVER

INVENTORS

BY Wenderoth, Lind & Ponack

ATTORNEYS

TABLE IV

Flexural Strength of ALSIMAG #614 Alumina with Surface Layers Formed by Reaction with $CaCO_3$ (Rods, 0.125" diameter)

| Example No. | Treatment | Treatment Conditions Temp °C | Treatment Conditions Time Hours | No. Samples | Flexural Strength Data: Average Strength* psi | Flexural Strength Data: Strength Difference psi |
|---|---|---|---|---|---|---|
| | As received controls | - | - | 19 | 49,700 | - |
| | Refired controls | 1200 | 20 | 5 | 57,900 | + 8,200 |
| 21 | Packed in $CaCO_3$ | 1200 | 20 | 5 | 65,900 | + 16,200 |
| | Refired controls | 1250 | 4 | 5 | 57,100 | + 7,400 |
| 22 | Packed in $CaCO_3$ | 1250 | 4 | 5 | 64,600 | + 14,900 |
| | Refired controls | 1300 | 4 | 5 | 55,500 | + 5,800 |
| 23 | Packed in $CaCO_3$ | 1300 | 4 | 5 | 68,200 | + 18,500 |
| | Refired controls | 1350 | 4 | 5 | 55,200 | + 5,500 |
| 24 | Packed in $CaCO_3$ | 1350 | 4 | 5 | 69,200 | + 19,500 |
| | Refired controls | 1400 | 4 | 5 | 58,700 | + 9,000 |
| 25 | Packed in $CaCO_3$ | 1400 | 4 | 5 | 54,200 | + 4,500 |

* four-point loading on a two-inch span

HENRY P. KIRCHNER
RALPH E. WALKER, &
ROBERT M. GRUVER
INVENTORS

BY Wenderoth, Lind & Ponack
ATTORNEYS

TABLE V

Flexural Strength of Coors AD999 Packed in $CaCO_3$ and Refired at Various Temperatures

| Example No. | Number of Rods | Treatment Conditions | Flexural Strength | |
|---|---|---|---|---|
| | | | Average Strength psi | Strength Difference psi |
| Controls | 5 | | 56,300 | |
| 26 | 2 | Packed and refired 1250°C | 93,800 | + 37,500 |
| 26a | 2 | Packed and refired 1300°C | 73,300 | + 17,000 |
| 27 | 3 | Packed and refired 1350°C | 82,000 | + 25,700 |
| 27a | 3 | Packed and refired 1350°C | 85,400 | + 29,100 |
| 28 | 1 | Packed and refired 1400°C | 56,600 | --- |

INVENTORS
HENRY P. KIRCHNER,
RALPH E. WALKER, &
ROBERT M. GRUVER

BY Wenderoth, Lind & Ponack
ATTORNEYS

TABLE VI

Flexural Strength of ALSIMAG #614 Alumina
with Surface Layers Formed by Reactions with Various Calcium Compounds
(Rods, 0.125" diameter)

| Example No. | Treatment | Treatment Conditions | | No. Samples | Flexural Strength Data | |
|---|---|---|---|---|---|---|
| | | Temp °C | Time Hours | | Average Strength* psi | Strength Difference psi |
| | As received controls | - | - | 19 | 49,700 | - |
| | Refired controls | 1350 | 1 | 5 | 46,900 | - 2,800 |
| 29 | Packed in $CaCO_3$(ACS) | 1350 | 1 | 5 | 54,900 | + 5,200 |
| 30 | Packed in $CaO.2Al_2O_3$ | 1350 | 1 | 5 | 54,000 | + 4,300 |

* Four-point loading on a two-inch span

HENRY P. KIRCHNER,
RALPH E. WALKER, &
ROBERT M. GRUVER

INVENTORS

BY Wenderoth, Lind & Ponack

ATTORNEYS

TABLE VII

Flexural Strength of ALSIMAG #614 Alumina
Packed in Silicon Carbide
(Rods 0.125" diameter)

| Example No. | Treatment | Treatment Conditions Temp °C | Time Hours | No. Samples | Flexural Strength Data Average Strength* psi | Strength Difference psi |
|---|---|---|---|---|---|---|
| | As received controls | - | - | 19 | 49,700 | - |
| | Refired controls | 1300 | 19 | 5 | 53,300 | + 3,600 |
| 31 | Packed in 600-mesh SiC | 1300 | 19 | 5 | 63,100 | + 13,400 |
| | Refired controls | 1400 | 1 | 5 | 58,600 | + 8,900 |
| 32 | Packed in 600-mesh SiC | 1400 | 1 | 5 | 56,800 | + 7,100 |
| | Refired controls | 1400 | 4 | 5 | 55,400 | + 5,700 |
| 33 | Packed in 600-mesh SiC | 1400 | 4 | 5 | 64,900 | + 15,200 |
| | Packed in 120-mesh SiC | 1400 | 4 | 5 | 49,400 | - 300 |
| | Refired controls | 1500 | 1 | 5 | 62,500 | + 12,800 |
| 35 | Packed in 600-mesh SiC | 1500 | 1 | 5 | 58,100 | + 8,400 |

* Four-point loading on a two-inch span

HENRY P. KIRCHNER
RALPH E. WALKER, &
ROBERT M. GRUVER
INVENTORS

BY Wenderoth, Lind & Ponack
ATTORNEYS

TABLE VIII

Flexural Strength of Coors AD999 Packed in Sic and Refired at Various Temperatures

| Example No. | Number of Rods | Treatment Conditions | Flexural Strength: Average Strength psi | Flexural Strength: Strength Difference psi |
|---|---|---|---|---|
| Controls | 5 | | 56,300 | |
| 36 | 3 | Packed and refired 1250°C | 75,700 | + 19,400 |
| 36a | 3 | Packed and refired 1300°C | 84,700 | + 28,400 |
| 37 | 3 | Packed and refired 1350°C | 77,500 | + 21,200 |
| 37a | 3 | Packed and refired 1400°C | 59,000 | + 2,700 |
| 38 | 3 | Packed and refired 1500°C | 78,200 | + 21,900 |

*INVENTORS*
HENRY P. KIRCHNER,
RALPH E. WALKER, &
ROBERT M. GRUVER

BY Wenderoth, Lind & Ponack

*ATTORNEYS*

TABLE IX

Flexural Strength of ALSIMAG #614 Alumina
Dipped in Molten $Li_2CO_3$ and Packed in Silicon Carbide
(Rods, 0.125" diameter)

| Example No. | Treatment | Treatment Conditions | | No. Samples | Flexural Strength Data | |
|---|---|---|---|---|---|---|
| | | Temp °C | Time Hours | | Average Strength psi | Strength Difference psi |
| 42 | Dipped in molten $Li_2CO_3$, refired | 1200 | 1 | 3 | 44,100** | - |
| 39 | Dipped in molten $Li_2CO_3$, refired, | 1200 | 1 | | | |
| | refired packed in 600-mesh SiC | 1300 | 19 | 3 | 80,300** | - |
| | Refired packed in 600-mesh SiC | 1300 | 19 | 3 | 78,200** | - |
| | As received controls | - | - | 19 | 49,700* | - |
| 40 | Dipped in molten $Li_2CO_3$, refired | 1200, | | | | |
| | refired packed in 600-mesh SiC | 1400 | 4 | 5 | 53,000* | + 3,300 |
| 43 | Dipped in molten $Li_2CO_3$, refired | 1200, | | | | |
| | refired | 1500 | 1 | 3 | 53,500* | + 3,800 |
| 41 | Dipped in molten $Li_2CO_3$, refired | 1200, | | | | |
| | packed in 600-mesh SiC, refired | 1500 | 1 | 4 | 60,900* | +11,200 |

* Four-point loading on a two-inch span
**Three-point loading on a one-inch span INVENTORS
HENRY P. KIRCHNER,
RALPH E. WALKER and
ROBERT M. GRUVER BY Neuderoth, Lind & Ponack
ATTORNEYS TABLE X
Flexural Strength of ALSIMAG #614 Alumina with Surface Layers Formed by Reactions with Lithium
(Rods 0.125" diameter)

| Example No. | Treatment | Treatment Conditions Temp °C | Treatment Conditions Time Hours | No. Samples | Flexural Strength Data: Average Strength psi | Flexural Strength Data: Strength Difference psi |
|---|---|---|---|---|---|---|
| | As received controls | - | - | 19 | 49,700* | - |
| | Refired controls | 1000 | 4 | 5 | 50,000* | - |
| 44 | Coated with $Li_2CO_3$ slip, refired | 1000 | 4 | 5 | 57,000* | + 7,300 |
| 45 | Coated with $Li_2CO_3$, refired | 1000 | 3 | 5 | 58,900* | + 9,200 |
| 46 | Packed in 60 mole % $Li_2CO_3$ 40 mole % $Al_2O_3$ refired | 1000 | 3 | 5 | 53,500* | + 3,800 |
| 47 | Coated with $Li_2CO_3$, refired, recoated. refired | 1000, 1000 | 3, 4 | 5 | 58,100* | + 8,400 |
| 48 | Coated with $Li_2CO_3$, flame treated, recoated, refired | 1000 | 2 | 5 | 58,800* | + 9,100 |
| | Refired controls | 1200 | 1 | 5 | 53,500* | - |
| | Surface leached, dipped in $Li_2CO_3$ slip, refired | 1200 | 1 | 5 | 28,800* | - 20,900 |
| | Surface leached, dipped in molten $Li_2CO_3$, refired | 1200 | 1 | 5 | 26,300* | - 23,400 |
| | Dipped in molten $Li_2CO_3$, refired | 1200 | 1 | 5 | 41,300* | - 8,400 |
| | Dipped in $Li_2CO_3$, flame glazed, redipped, refired | 1200 | 1 | 5 | 36,500* | - 13,200 |
| | As received controls | - | - | 5 | 58,200** | - |
| 49 | Coated with $Li_2CO_3$ slip, refired, refired, quenched | 1000, 1000 | 4, 4 | 5 | 74,200** | + 16,000 |
| 50 | Coated with $Li_2CO_3$ slip, refired refired, quenched | 1000, 1000 | 4, 4 | 5 | 75,400** | + 17,200 |

*Four-point loading on a two-inch span
**Three-point loading on a one-inch span

INVENTORS
HENRY P. KIRCHNER,
RALPH E. WALKER and
ROBERT M. GRUVER

BY Wenderoth, Lind & Ponack
ATTORNEYS

TABLE XI

Flexural Strength of Linde Sapphire Single Crystals with Various Treatments
(Centerless ground, flame polished, 0.10" diam.)

| Example No. | Treatment | Firing Conditions Temp °C | Firing Conditions Time Hours | No. Samples | Average Flexural Strength psi |
|---|---|---|---|---|---|
| | As received, not oriented | - | - | 5 | 103,100 |
| | As received, 90° orientation | | | | |
| | | 1500 | 1 | 5 | 104,900 |
| 51 | Packed in $CaCO_3$, refired 90° orientation | 1350 | 3 | 2 | 269,800 |
| 52 | Packed in $Cr_2O_3$, refired, not oriented | 1500 | 1 | 2 | 154,300 |
| 53 | Packed in $Cr_2O_3$, refired 0° orientation | 1500 | 3 | 2 | 220,200 |
| 54 | Packed in $Cr_2O_3$, refired, 45° orientation | 1500 | 3 | 2 | 227,600 |
| 55 | Packed in 80% $Cr_2O_3$ 20% $CrF_3 \cdot 3\text{-}1/2\ H_2O$, refired, not oriented (opaque) | 1500 | 3 | 4 | 104,200 |

INVENTORS
HENRY P. KIRCHNER,
RALPH E. WALKER and
ROBERT M. GRUVER

BY Wenderoth, Lind & Ponack
ATTORNEYS

TABLE XII

Flexural Strength of Sapphire with Mullite Surface Layers
(0° Orientation)

| Example No. | Treatment | No. Samples | Average Flexural Strength psi |
|---|---|---|---|
| | As received controls | 3 | 161,400 |
| 56 | Packed in 600-mesh SiC, refired 1350°C, 8 hours | 3 (1) | 236,900 |
| 57 | Packed in 600-mesh SiC, refired 1500°C, 6 hours | 3 (1) | 258,300 |
| 58 | Packed in 600-mesh SiC, refired 1650°C, one hour | 4 | 130,400 |

(1) one low value not included in average

INVENTORS
HENRY P. KIRCHNER,
RALPH E. WALKER, &
ROBERT M. GRUVER

BY Wunderath, Lind & Ponack

ATTORNEYS

United States Patent Office 3,713,877
Patented Jan. 30, 1973

3,713,877

METHOD OF STRENGTHENING CERAMIC BODIES AND STRENGTHENED CERAMIC BODIES PRODUCED THEREBY

Henry P. Kirchner, State College, Ralph E. Walker, Julian, and Robert M. Gruver, State College, Pa., assignors to Henry P. Kirchner, Borough of State College, Pa.

Continuation-in-part of application Ser. No. 475,450, July 28, 1965. This application Feb. 10, 1969, Ser. No. 813,788
Int. Cl. C04b *35/02*
U.S. Cl. 117—123 A 49 Claims

ABSTRACT OF THE DISCLOSURE

A method of increasing the bending strength and thermal shock characteristics of single crystal and polycrystalline ceramic bodies and strengthened ceramic bodies produced thereby. The bodies are strengthened by forming at least on one surface thereof at an elevated temperature a layer of low expansion material which is a material composed at least partly of the material of the body and which at the least has a coefficient of expansion which is less than that of the material of the body. The material can also have an increased volume, and can be a solid solution or the material of the body in a changed phase. The body is then cooled so as to produce on the surface of the body a layer which is under compression relative to the body.

Figure 1:
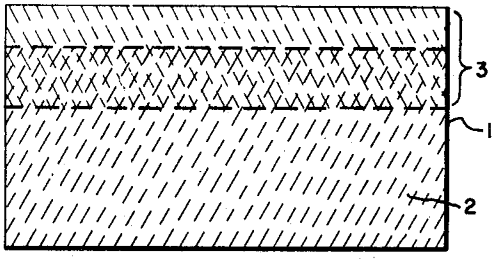

This application is a continuation-in-part of application Ser. No. 475,450, filed July 28, 1965, now abandoned.

The present invention relates to a method of physically strengthening single crystal and polycrystalline ceramic bodies, particularly those composed of metallic oxide ceramic compositions, and to the ceramic bodies strengthened by this method.

Polycrystalline ceramic bodies of the metallic oxide ceramics, such as titanium dioxide, magnesium oxide, spinel, and zirconia are finding more and more uses in present day technology, such as in radomes, windows for passing radiant energy in electronic tubes, and in structures used in aerospace technology. In addition, these types of ceramic materials have found considerable use in refractory technology. Single crystal ceramic bodies, such as sapphire, are also finding wider use in refractory technology.

A great drawback in the successful use of such materials has been their relatively fragile nature, both with respect to ordinary physical stresses and strains as well as so-called thermal shock. While these materials can withstand compressive stresses quite well, they are quite poor in their ability to withstand tensile stresses and bending stresses. This quite naturally limits their use in such structures as radomes and the like. This inability to withstand tensile stresses well also bears on their inability to withstand thermal shock. They withstand so-called temperature up shock, i.e. the stresses developed within the material when it is being heated up, quite well since the material tends to expand during the heating, thus becoming subjected to compressive stresses within the confines of the outside surfaces of the body. However, such materials do not withstand so-called temperature down shock, i.e. the stresses developed within the material when it is cooled. This is because when the contraction due to the cooling takes place, tensile stresses occur within the surface layers, and these tensile stresses are not easily withstood by the material. As a result, flaws develop within the material.

It is an object of the present invention to provide a method of treating ceramic bodies so as to improve their bending strength and thermal shock resistance properties.

It is a further object of the invention to provide treated ceramic bodies which have improved bending strength and thermal shock resistance characteristics.

The method of the present invention, in its broadest aspect, comprises forming on the surface of the ceramic body to be strengthened a layer of a material which is under compression.

One way of carrying out the method of the present invention comprises reacting at an elevated temperature a reactant with the material of the body on at least one surface of a single crystal or polycrystalline ceramic body for creating a layer of a low expansion material, which, in a preferred embodiment, is a solid solution of a plurality of ceramic materials having a coefficient of expansion which is less than that of the ceramic material of the body so that when the body is cooled, there is produced on the surface thereof the layer which is under compression. Preferably, the layer is formed in a way such that the reactant material which mixes with the material of the body to form the compressive layer and the material of the body itself are present in the layer in proportions which vary from a high proportion of added reactant material at the outer surface of the layer to a low proportion of the reactant material the deeper into the layer the reactant material is present. This results in a stress gradient in the finished material with the greatest compression of the layer being at the surface thereof, and the compressive stresses decreasing in the direction of the center of the body.

A particular method of producing the compressive surface layer of the present invention in this way comprises forming at an elevated temperature on at least one surface of a single crystal or polycrystalline metallic oxide ceramic body a layer of a low expansion material which, in a preferred embodiment, is a solid solution or a mixture of metallic oxide and the metallic oxide of the body being coated, and which solid solution or mixture has a lower coefficient of expansion than the coefficient of expansion of the material of the body.

One metallic oxide ceramic which has been found to be strengthened to a great degree in this manner is $TiO_2$ and the solid solutions which have been found to be particularly effective in forming low expansion coatings are the solid solutions $TiO_2$—$SnO_2$ and $TiO_2$—$Cr_2O_3$. Also, solid solutions of MgO—NiO and MgO—CoO on MgO strengthened MgO bodies, and an alumina rich $$MgO.Al_2O_3$$

solid solution or a $MgO.Al_2O_3$—$MgO.Cr_2O_3$ solid solution on $MgO.Al_2O_3$ strengthens the spinel. A solid solution of MgO—NiO—ZnO or a solid solution of $$MgO—CoO—ZnO$$

on a body of 90% MgO—10% ZnO strengthens such a body. Mixtures of $UP_2O_7$—$UO_2$ will strengthen a body of $UO_2$, and mixtures of $5TiO_2.2P_2O_5$—$TiO_2$ on bodies of $TiO_2$ will strengthen these bodies. A solid solution of MgO—NiO or ZnO—NiO on a NiO base body strengthens such a base body.

Another particular method of producing a compressive surface layer according to the present invention in this way comprises reacting at an elevated temperature a reactant with the material of the body on at least one surface of a single crystal body or a polycrystalline ceramic body for creating a layer which is not only a low expansion material having a coefficient of expansion which is less than that of the ceramic material of the body, but which, at amibent temperature, also has a larger volume than the volume of the reactant plus the material of the body which has been reacted therewith. When the body with such a layer is cooled, the surface layer is placed under the compression because of two factors. The first is that the body material shrinks, or contracts, more than the material of the surface layer, thus leaving the surface layer under compression. The second factor is that the volume of the surface layer is increased relative to the material of the body from which the layer is formed, thereby producing compressive stresses in the layer. These two factors combine to form the compressive surface layer. As with the situation in which only a material which has a lower coefficient of expansion than the material of the body is formed, the layer of the present specific method is formed in a way such that the reactant material reacts with the material of the body to form the compressive layer from the material of the body itself in such a way that expanded volume materials are present in proportions which vary from a high proportion at the outer surface of the layer to a low proportion the deeper into the layer detection of the high volume material is carried out. This also results in a stress gradient in the finished material as described above.

One specific method of producing such a layer is by providing an expanded volume material which has essentially the same chemical composition as the material of the body, but which has a different crystalline phase which has a larger volume than the material of the body. Stabilized zirconia, i.e. $ZrO_2$ stabilized so that a high proportion thereof will remain in cubic phase, can be destabilized to destabilized zirconia, i.e. zirconia with a high proportion thereof in monoclinic phase. When the destabilization is confined to the surface layer of a zirconia body, there is produced a surface layer which is a mixture of monoclinic $ZrO_2$ and cubic $ZrO_2$ with a gradient from the surface layer of the body which has a high proportion of monoclinic to a point within the body at which the high proportion of cubic is present.

Another specific method of producing a layer in which the expanded volume as well as the reduced coefficient of expansion material is present is by producing a spinel, magneto-plumbite, or other similar phase with an open structure in the surface layer of alumina bodies. Reacting the surface layer of alumina bodies to produce a calcium aluminate material has been found to strengthen the alumina body by forming a compressive surface layer. Likewise, a reaction producing mullite ($Al_6Si_2O_{13}$) on the surface of an alumina body can produce a compressive surface layer. Reaction of a lithium containing compound with alumina to produce $LiAl_5O_8$ (spinel structure) in the surface layer of an alumina body provides an increase in strength. Reaction of nickel oxide with alumina to produce $NiAl_2O_4$ (spinel structure) can produce a surface layer which is under compression due at least partially to the expanded form of the nickel alumina spinel. Reaction of magnesium oxide with almina or chromium oxide bodies to produce $MgAl_2O_4$ (spinel) or $MgCr_2O_4$ (spinel structure) produces a compressive surface layer which gives increased strength.

Sodium oxide can be reacted with alumina to produce $2NaAl_{11}O_{17}$ (magneto-plumbite structure) which has an increased volume contributing to the compression surface layer.

The compressive surface layer can also be produced by creating on the body a surface layer of a material which, while it has a coefficient of expansion which is the same as or larger than that of the body, nevertheless has a sufficiently increased volume that the net effect is to place the surface layer under compression.

While in the following examples the firing of the ceramic bodies to produce the low expansion coefficient type surface layer has been carried out at temperatures in the vicinity of 1400° C., it is contemplated that the firing can be carried out anywhere between 1000° C. and 2500° C. where no pressure is applied to the bodies during firing, and depending on the nature of the materials and the degree of reaction between the raw materials of the surface layer and the body. Where pressure is applied during firing, lower temperatures can be used.

The invention will now be described in greater detail with reference to the accompanying drawings, in which:

FIG. 1 is a sectional view of a polycrystalline ceramic body having a low expansion surface layer thereon in accordance with the present invention;

FIGS. *2a–2c* are graphs showing the tin content of a ceramic body at various distances from a coated surface thereof.

As seen in FIG. 1, a body 1 of polycrystalline ceramic material 2 has at least one surface, the top surface in this instance, coated with a layer 3 which is under compression. The layer 3 is composed of the material of the body and at least one further material, either one or more ceramic materials in solid solution or mixed with the material of the body, a material which has essentially the same chemical composition as the material of the body but is in a changed state, or a reaction product with the material of the body. The materials which are combined with the material of the body to form the layer are intermixed to form the surface layer, there being a gradual increase in the proportion of body material and a gradual decrease of the proportion of surface layer forming material the deeper into the surface layer the determination of the relative amounts of these materials is made. The concentration of the intermixed material with respect to the material of the body varies from as high as 100% at the surface of the layer 3 to 0% at the surface of the body 2. The surface layer can be said to end at this point. The low expansion surface layer 3 is under compression as a result of having been formed on the body material 2 at a high temperature, and the temperature of the overall structure reduced to ambient temperature. Since the relative amount of surface layer forming material 3 decreases as the distance from the coated surface of the layer increases, there is also a stress gradient, the compressive stress being greatest at the surface of the surface layer and decreasing in proportion to the amount of surface layer forming material the greater the distance from said surface. In the examples which follow, it has been found that the good results are achieved when the surface layer extends into the material 2 of the body a distance of from about .001 to .060 inch. However, in practical applications, the thickness of the coating will depend on a great variety of factors. The major factor will usually be the size of the body to be strengthened. If it is a chip of ceramic material to support a miniaturized circuit, the thickness of the compressive surface layer may be on the order of a unit cell thickness, i.e. the smallest volume element that when repeated in space can be used to build the entire crystal. On the other hand, if the body to be strengthened is a large radome, the thickness may be on the order of large fractions of an inch. In some cases, the thickness of the layer may approach 50% of the thickness of the base. The thickness can thus vary between wide limits.

Specific exemplifications of both the materials of the surface layer 3 and the body 2, as well as the specific methods of forming the surface layer, will show the best method of carrying out the invention.

EXAMPLE 1

A low expansion coefficient surface layer was provided on a titania body by forming a solid solution of tin oxide and titanium oxide at the surface of the body.

Bodies of rutile titanium oxide were prepared from TAM heavy grade titanium oxide. In order to permit the firing of the bodies at temperatures sufficiently high to form the low expansion coefficient type compressive surface layers thereon, it was found desirable to incorporate in the titanium dioxide some tungstic oxide, $WO_3$. One-quarter mole percent tungstic oxide, based on the amount of titanium dioxide, has been found to produce sufficient reduction in grain size of the final ceramic body to be satisfactory.

The raw titanium dioxide and tungstic oxide were mixed in mortar and pestle and screened through a 100 mesh sieve. There was then added as a binder 15% by weight (weight of the dry powder of the mixed oxides) a 15% solution of polyvinyl alcohol in water, and the wetted powder was further thoroughly mixed in a mortar and pestle. The mixed material was completely dried, and then 2% by weight water was added so that the material passed cleanly through a 50 mesh sieve under the action of a plastic scraper and did not clog the sieve openings, as a result of which free flowing granules were obtained. The granules were pressed into bars having the dimensions 3" x 3/8" x 1/4" at a pressure of 10,000 p.s.i.

The thus formed bars were then coated with a tin containing solution such that when they were heated during the firing of the bars, a solid solution of $TiO_2$-$SnO_2$ was formed. This was carried out by first making up an aqueous solution of stannic chloride containing 1/2 gram $SnCl_4.5H_2O$+0.2 ml. $H_2SO_4$ (conc.) per milliliter.

In order to increase the porosity of the surface of the titania bodies before coating with the tin-containing solution, the bodies were fired at 700° C. for one-half hour to burn out some of the binder. The bodies were then dipped into the tin-containing solution and held in the solution for about 60 seconds.

The bodies were then fired in an electrically heated furnace at 1400° C. for a period of about 1 hour. At the same time, undipped bodies were also fired under the same conditions in order to serve as controls for the determination of any improvement in the strength of the coated bodies. The bodies were cooled in the furnace.

As compared with four control bars which had an average flexural strength of 19,350 p.s.i., five bars dipped in the solution had an average flexural strength of 24,380 p.s.i., an increase of 5,030 p.s.i. over the strength of the control bars.

Figure 2A:
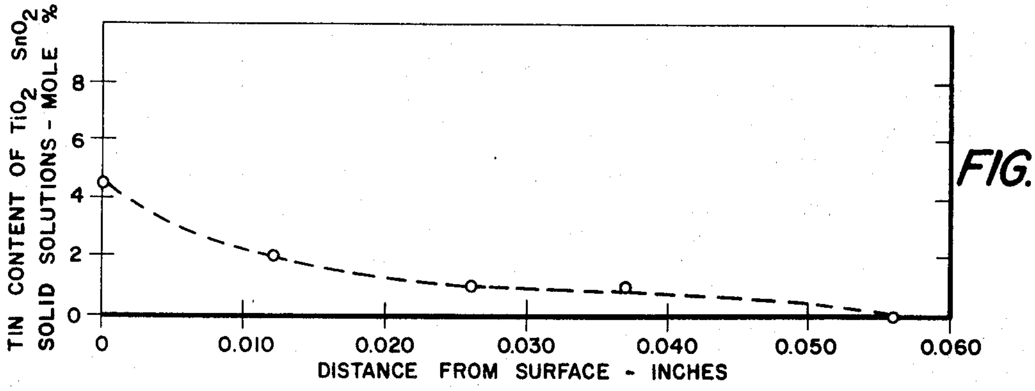

The tin content of the bar at various distances from the surface, as measured by X-ray diffraction, was as shown in FIG. 2*a*. This shows that the tin content of the solid solution surface layer decreases as the distance from the surface increases.

The significance of the increase in the strength of the strengthened bars over the unstrengthened bars can be seen when the standard deviations for the two type of bars are taken into consideration and the use of the standard deviations in determining design stresses which can be chosen for the materials. It has been found that the increase in strength of the treated bars is accompanied by a decrease in the standard deviation, and because of this factor, if a designer chose to use a stress level three standard deviations below the average, the design stress chosen for the treated bars would be 64% higher than the design stress for the untreated material. This is a truly significant increase and makes clear that the smaller percentage increase in the average strengths does not fully reflect the improvement that the claimed method makes in the strength of these ceramic materials.

EXAMPLE 2

A low coefficient of expansion surface layer in the form of a solid solution of tin oxide and titanium oxide was formed on a titania body by a different method than in Example 1.

Bodies of rutile titanium oxide were prepared in the same manner as in Example 1, except that the step of firing to burn out some of the binder was omitted.

Stannic chloride-sulphuric acid solutions were prepared as in Example 1, and in addition, a second and third solution of 1 gram $SnCl_4\cdot 5H_2O$+0.4 ml. $H_2SO_4$ per milliliter of solution and 2 grams $SnCl_4\cdot 5H_2O$+0.8 ml. $H_2SO_4$ per milliliter of solution respectively were prepared. The bodies were coated with the tin-containing solution by dipping them into one or another of the solutions for various periods of time as shown in the accompanying Table A, and the bodies were all fired as in Example 1.

The strengths of the various samples are as shown in Table A.

Figure 2B:
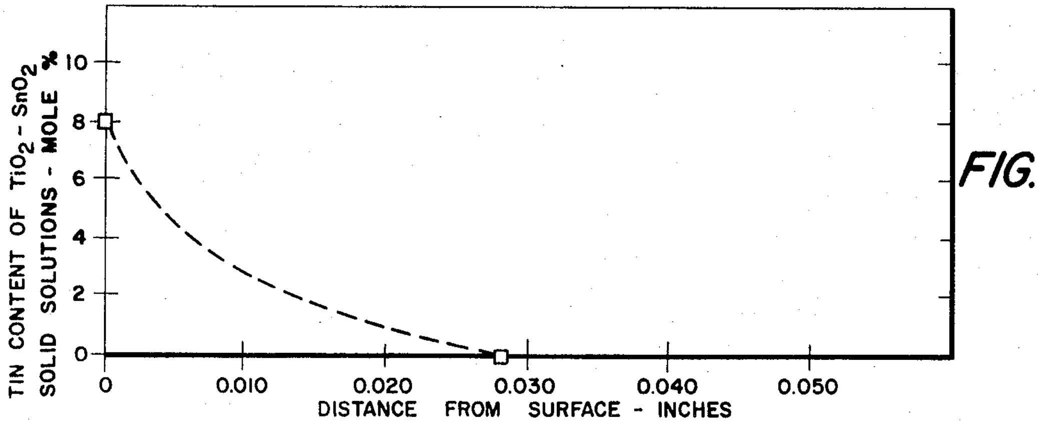

The tin content of a typical bar from the tests as set forth in Table A at various distances from the surface, as measured by X-ray diffraction, was as shown in FIG. 2*b*.

TABLE A

| Type of sample | Number of samples | Solution | Time of dipping, seconds | Average flexural strength, p.s.i. | Increase over control |
|---|---|---|---|---|---|
| Control | 19 | | | 16,270 | |
| Test | 20 | 1 | 30 | 18,830 | 2,360 |
| Do | 13 | 1 | (1) | 18,187 | 1,917 |
| Do | 17 | 1 | (1) | 18,738 | 2,488 |
| Do | 16 | 1 | (2) | 18,069 | 1,799 |
| Do | 18 | 3 | 30 | 18,343 | 2,073 |
| Control | 19 | | | 17,775 | |
| Test | 19 | 1 | 30 | 20,295 | 2,520 |
| Control | 22 | | | 18,696 | |
| Test | 20 | 2 | 30 | 19,847 | 1,151 |
| Control | 19 | | | 18,707 | |
| Test | 19 | 2 | 60 | 20,502 | 1,795 |

[1] 2 times 30 seconds each.
[2] 4 times 30 seconds each.

EXAMPLE 3

A low coefficient of expansion layer of tin oxide and titanium oxide was formed on a titanium body by a still further method.

Bodies of rutile titanium oxide were prepared in the same manner as in Example 1, except that the step of firing to burn out some of the binder was omitted.

A solution of an organic tin-containing compound was used to coat the body with a tin-containing material. Two milliliters of a solution of tri-n-butyl tin oxide was applied to the surface of each of the bars by dropping one half of the liquid uniformly on one surface of the bars and then the remaining half on the opposite surface of the bars.

The bodies were then fired under the same conditions as the bars of Example 1, along with uncoated control bars.

As compared with 22 control bars, 10 bars coated with the tri-n-butyl tin oxide had an average flexural strength of 19,585 p.s.i., almost 890 p.s.i. greater than the average flexural strength of the control bars.

Figure 2C:
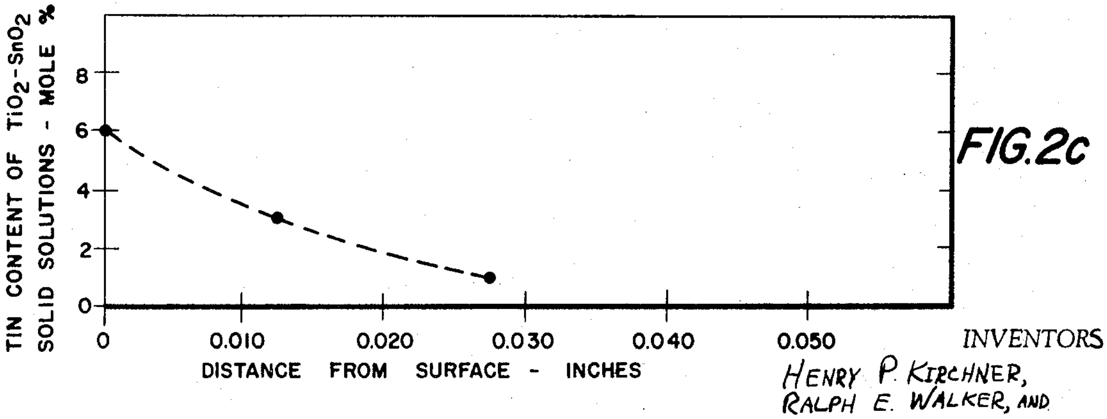

The tin content of the bar at various distances from the surface, as measured by X-ray diffraction, was as shown in FIG. 2*c*.

In the foregoing examples, the firing temperature can be varied from about 1000° C. to about 1600° C., depending on the degree of reaction which is desired between the tin-containing solution and the $TiO_2$ body.

EXAMPLE 4

A low coefficient of expansion layer of chromium oxide and titanium oxide was formed on a titania body.

Bodies of rutile titanium oxide were prepared in the same manner as in Example 1, except that the step of firing to burn out some of the binder was omitted.

The bars were packed in $Cr_2O_3$ powder in a closed sagger, and were then fired under the same conditions as the bars of Example 1, i.e. for a period of 1 hour at a temperature of 1400° C., along with uncoated control bars. The bars were cooled in the sagger in the furnace.

The packed bars had a black surface layer on the outside after firing, which layer changed to the typical tan of the rutile $TiO_2$ body at a sharp dividing line at a considerable depth within the body. This indicates that a layer of a solid solution of $TiO_2$—$Cr_2O_3$ was formed on the surface of the body during the firing.

As compared with the average flexural strength of 15 control bars, the flexural strength of the bars with the $TiO_2$—$Cr_2O_3$ solid solution on the surfaces thereof had an average flexural strength of 17,717 p.s.i. 690 p.s.i. greater than the flexural strength of the control bars.

In the foregoing example, the firing temperature can be varied from about 1000° C. to 1600° C., depending on the degree of reaction which is desired between the $Cr_2O_3$ and the $TiO_2$.

EXAMPLE 5

A low expansion solid solution layer was formed on a Spinel body.

Spinel ($MgO.Al_2O_3$) having a composition of 57% MgO and 43% $Al_2O_3$ was prepared by precipitation from solution. Magnesium carbonate and aluminum were dissolved in HCl solution, and the material was precipitated by adding $NH_4OH$. The precipitate was washed with distilled water, dried, and fired at 800° C. for 1 hour. The resulting material was ball milled overnight, and then binders were added and bars were pressed. Some of the bars were fired at 1650° C. for 1 hour, cooled in the kiln, then packed in $Cr_2O_3$ powder, and refired at 1400° C. for eight hours and cooled in the kiln. As compared to control bars similarly treated, except for being packed in the powder, the packed bars showed an average increase in flexural strength of about 1,400 p.s.i. over the flexural strength of about 12,900 p.s.i. for the control bars. In this example, the packing of the Spinel in the $Cr_2O_3$ results in the formation of a low expansion $$MgO.Al_2O_3—MgO.Cr_2O_3$$

solid solution on the surface of the bars.

EXAMPLE 6

A solid solution of 90% MgO—10% ZnO was prepared, and bars of this material similar to the bars of Example 1 were prepared. The bars were packed in NiO and fired at temperatures on the order of 1400–1650° C. and cooled in the kiln. The thus fired bars had a solid solution low expansion surface layer thereon, and were strengthened as compared to bars fired at the same temperature, and which were not so packed.

EXAMPLE 7

Bars identical to the bars of Example 6 were prepared, and were packed in CoO and fired at similar temperatures. As with the bars of Example 6, the thus fired bars had a solid solution low expansion surface layer thereon, and were strengthened as compared to bars fired at the same temperature and which were not so packed.

EXAMPLE 8

Bars of NiO about 1¼" long, ¼" wide and ⅛" thick, were prepared by hot pressing a nickel oxide powder under a pressure of 10,000 lbs./sq. in. at a temperature of about 1050° C. for a period of about 30 min.

Prior to the time the bars were hot pressed, they were packed in MgO in a manner similar to the manner in which the titanium oxide bars were packed in chromium oxide in Example 4. During the hot pressing, the MgO penetrated into the NiO bodies, and a solid solution compressive coating was formed on the surface of the bodies.

Strength tests of the thus coated NiO bodies showed an increase in bending stress over an uncoated NiO body which was hot pressed under the same conditions of about 3,500 p.s.i.

It will thus be seen that many different oxygen containing materials can be used in forming the solid solution surface layers. In this specification and claims the term "oxides" will be used to designate such materials, whether they be simple oxides, such as $SnO_2$ or NiO, or more complex materials, such as aluminates or phosphates and the like.

From the foregoing examples one general method of carrying out the invention can be seen. The ceramic body which is to be strengthened is chosen, and then there is chosen from data on the expansion coefficients of solid solutions of the material of the body with other ceramics a solid solution which has a lower coefficient of expansion than that of the material of the body. This solid solution is then formed on the surface of the body to be strengthened by using appropriate materials and forming them into a solid solution with the material of the body at an elevated temperature and thereafter cooling the body with the solid solution thereon to produce on the surface of the body the layer which is under compression relative to the body.

While the specific examples given above disclose specific solid solutions and specific ways of obtaining them, the invention is not limited to these specific examples. In many instances it may be advantageous, for example, to form the solid solution apart from the body to be strengthened, and then apply it to the body in a separate step.

A ceramic body can also have a compressive surface layer formed thereon by changing the crystalline phase of the material of the surface layer or to form a reaction product from it so as to cause it to increase in volume, and which preferably has a lower coefficient of expansion. One such material in which a change in the crystalline phase of the material can be carried out is zirconia, which has been stabilized so as to keep it in the cubic form. When the surface of such a zirconia body is treated by a method including a firing step so as to destabilize it, there is an increase in volume when the cubic phase changes to monoclinic when the material is cooled to room temperature following the firing. An additional compressive stress is produced in this case because monoclinic zirconia has a lowemr coefficient of expansion than does cubic zirconia. A material which can be used to form a reaction product of increased volume to produce a compressive surface layer is alumina in which reactions therewith form spinel, magneto-plumbite, or other similar open structure. The compressive surface layer of these types is thus formed as a result of both the volume increase and the difference in the expansion coefficients.

The use of such a reaction to obtain a compressive surface layer is attractive because the compressive stresses are not relieved completely when the thus treated bodies are reheated, at least within a certain temperature range. The strength advantage is thus retained when the bodies are heated. The following examples illustrate some specific ways of carrying out the method in this manner.

EXAMPLES 9–18

A number of zirconia bodies were prepared using Zirconia R, a cubic phase of zirconia stabilized with CaO and Mgo, and which is a product of Titanium Alloy Division, National Lead Co. The zirconia was mixed with 5% by weight of a 15% PVA binder solution and formed into plates at 7500 p.s.i. The plates were fired at 1650° C. for one hour, and bars approximately 0.095" x 0.235" x 1.75" were cut from the plates.

Groups of bars were packed in silicon carbide in the form of abrasive grain and refired at various temperatures and firing times, and then cooled in the kiln. The bars of Group 9 were fired for 18 hrs. at a temperature of from 900–1000° C. those of Group 10 at 1150° C. for 4 hrs., those of Group 11 at 1200° C. for 4 hrs., and those of Group 12 at 1400° C. for 4 hrs. The bars of Group 13 were fired at 1500° C. for 1 hr., while those of Groups 15–18 were fired at 1300° C. for 4, 8, 8 and 19 hrs., respectively. The bars were packed in 600 mesh grains of the carbide, except for those of Group 17, which were packed in 120 mesh silicon carbide.

The bars of Group 14 were unfired bars, and were fired at 1650° C. for 1 hr.

As cut controls and controls which were simply refired without being packed were prepared for each of the examples, except Examples 10, 13, 14, 15 and 17, in which one or the other, or in the case of Example 14, both, of the controls was omitted.

The average flexural strength was measured for each of the example by 3 point loading on either a ½" or 1" span, and the results are shown in Table I. It will be seen that strength increases were observed in most cases. At low temperatures (1000° C.) the packed samples were no stronger than the refired controls, indicating little or no reaction. At high refiring temperatures (1500° C.) the reaction layer was very thick, constituting a large fraction of the thickness of the bar, and had a poor structure which resulted in a relatively low strength. Firing at 1300° C. for 8 hrs. with the relatively coarse 120 mesh silicon carbide gave the best results. Longer firing time (19 hrs.) at 1300° C. caused too much reaction, and resulted in weak bodies.

The mechanism of destabilization is believed to be the reaction of the SiO evaporated from the silicon carbide with the CaO or Mgo used to stabilize the zirconia. This results in depletion of the material available for stabilization, and in the formation of silicates.

To show that compressive stresses were produced in the bars by the treatments, slots were formed in the ends of the bars and the thickness measured before and after the formation of the slots. Table II shows the results of these tests on two refired samples, and indicates that the reduction in thickness due to the bending-in of the portions of the bar adjacent the slot is substantial, thus indicating the presence of compressive stresses in the surface layers.

EXAMPLES 19 AND 20

Alumina can be treated to form a reaction product so as to increase the compression in a compressive surface layer. Since alumina has a very densely packed atomic structure, most solid state reactions in which alumina is a reactant will result in products which have a greater volume than the reactants. It has been found that reactions for producing spinel structure and magneto-plumbite structure phases in the surface layer of alumina bodies work best at about 1300° C. a relatively low temperature, which gives the advantage that the stresses which are brought about by the increase in volume are not relieved by plastic deformation.

The calcium aluminate $CaAl_4O_7$ and $CaAl_{12}O_{19}$ were prepared by reacting $CaCO_3$ and $Al_2O_3$, and these aluminates were used as a packing material. Alumina rods, 0.125 in. in diameter and about 2 in. long ALSIMAG #614, 96% alumina which is a product of American Lava Co., were packed, some in $CaAL_4O_7$ and other in $CaAl_{12}O_{19}$. The packed rods were fired at 1400° C. for a period of about 5–20 hrs. and cooled in the kiln. The diameters of the rods increased from about 0.126" to about 0.131".

A second group of rods packed in the same way were fired at 1300° C. for about 5–20 hrs. and cooled in the kiln, but little or no increase in diameter was observed. X-ray diffraction analysis of the surface layers indicated complex reaction products, but positive identification of the precise phases was not possible.

Similar rods of ALSIMAG #614 were packed in calcium carbonate and refired at 1350° C. for 4 hrs. and were cooled in the kiln. The ends of the rods were slotted, and the change in diameter due to the bending-in of the portions on the opposite sides of the slot was measured. The results are given in Table III, and show that compressive surface layers were formed which caused the ends of the rods on opposite sides of the slot to move toward each other.

EXAMPLES 21–25

ALSIMAG #614 alumina rods, as described above, were packed in calcium carbonate, and the rods of Example 21 were fired at 1200° C. for 20 hrs. The rods of Examples 22–25 were fired for 4 hrs. at temperatures of 1250°, 1300°, 1350° and 1400° C., respectively. All of the rods were cooled in the kiln. The flexural strength was then measured by 4 point loading on a 2 inch span, and the strengths were substantially greater than the refired controls, i.e. rods refired without packing. The results indicate the treatments are less effective at high temperatures and shorter firing times. This may be the result of relief of the stresses by plastic deformation.

EXAMPLES 26–28

Coors AD999 alumina rods 0.118 in. in diameter and 2.25 in. long, were packed in calcium carbonate and refired at various temperatures for a period of three hours. The flexural strengths were then measured by 4 point loading on a 2 inch span, and the results were as given in Table V. The strengths were even greater than for the ALSIMAG #614.

EXAMPLES 29 AND 30

Rods of ALSIMAG #614 alumina, as described above, were packed in various calcium compounds, the rods of group 29 being packed in calcium carbonate and the rods of group 30 being packed in $CaO \cdot 2Al_2O_3$, and the two groups were fired at 1350° C. for 1 hr. and cooled in the kiln. Flexural strength tests made by 4 point loading on a 2 inch span showed the strengths to be as given in Table VI.

EXAMPLES 31–35

It has been found that in order to obtain a uniform reaction with the surface of polycrystalline alumina bodies, it is necessary to transport the reactant material through the gas phase, because there is insufficient solid to solid contact between the packing materials and the ceramic body being treated. The previous examples have dealt with the oxides, among which are included aluminates and carbonates. Other compounds can be used which will produce the same results.

Groups of ALSIMAG #614 alumina rods, as described above, were packed in silicon carbide. The rods of Examples 31–33 and 35 were packed in 600 mesh silicon carbide, while the rods of Example 34 were packed in 120 mesh silicon carbide. The rods of Example 31 were fired at 1300° C. for 19 hrs., the rods of Examples 32 and 33 at 1400° C. for 1 and 4 hrs., respectively, the rods of Example 34 at 1400° C. for 4 hrs., and the rods of Example 35 at 1500° C. for 1 hr. The rods were cooled in the kiln, and the flexural strength determined by 4 point loading on a 2 inch span. The results are shown in Table VII, from which it can be seen that improvements in the strength were produced in all but the rods packed in the coarse material. X-ray diffraction examination of the surfaces of the treated rods showed substantially $Al_6Si_2O_{13}$ (mullite), which has a larger volume than alumina.

EXAMPLES 36–38

Coors AD999 alumina rods 0.118 in. in diameter and 2.25 in. long were packed in a silicon carbide and refired at various temperatures for a period of three hours. The flexural strengths were then measured by 4 point loading on a 2 inch span, and the results were as given in Table VIII. The strengths were even greater than for the ALSIMAG #614 alumina.

EXAMPLES 39–41

Pretreatment of the alumina bodies prior to packing in silicon carbide and firing has been found to give some improvement. Groups of ALSIMAG #614 alumina rods, as described above, were first dipped in molten lithium carbonate ($Li_2CO_3$) and thereafter refired for 1 hr. at 1200° C., and cooled in the kiln. They were then packed in 600 mesh silicon carbide, and the rods of Example 39 were refired at 1300° C. for 19 hrs., the rods of Example 40 were fired at 1400° C. for 4 hrs., and the rods of Example 41 were fired at 1500° C. for 1 hr. The strengths were as shown in Table IX. The samples of Example 39 and the controls therefor, which were simply packed in the silicon carbide and fired, were determined by 3 point loading on a 1 in. span and were unusually high. The increases in strength in Examples 40 and 41 were not significantly higher than when the pretreatment was omitted, as described above in connection with Examples 31–35.

EXAMPLES 42 AND 43

Formation of a spinel structure ($LiAl_5O_8$) in the surface of aluminum bodies has been found to produce increases in strength.

Two groups of ALSIMAG #614 alumina rods were dipped in molten lithium carbonate, and the samples of Example 42 were refired at 1200° C. for 1 hr., and the rods of Example 43 were refired in the same manner and again refired at 1500° C. for 1 hr. The strengths are as shown in Table IX.

EXAMPLES 44–50

ALSIMAG #614 alumina rods, as described above, were packed in various materials and refired. The rods of Example 44 were coated with lithium carbonate slip and refired at 1000 C. for 4 hrs. The rods of Example 45 were coated with lithium carbonate slip and were refired at 1000° C. for 3 hrs. The rods of Example 46 were packed in finely divided packing material which was a mixture of 60 mol percent lithium carbonate and 40 mol percent aluminum oxide, and refired for 3 hrs. at 1000° C. The rods of Example 47 were coated with lithium carbonate slip and were refired at 1000° C. for 3 hrs. They were recoated in the same way and refired at 1000° C. for 4 hrs.

The rods of Example 48 were coated with lithium carbonate slip, were flame-treated, were recoated with lithium carbonate and refired at 1000° C. for 2 hrs. All the rods of the foregoing examples were cooled in the kiln.

The rods of Examples 49 and 50 were coated with lithium carbonate slip, refired, cooled in the kiln, again refired, both refirings being at 1000° C. for 4 hrs. After the second refiring, the samples were quenched in air.

The results of flexural strength tests by the various types of loading as indicated are shown in Table X. It can be seen that while coating with lithium carbonate and refiring leads to small increases in strength, these increases are much greater when quenching is used. Because the refiring is carried out at such low temperatures, the observed increases in strength as a result of quenching may result in limiting the creep of the surface layer during cooling in the kiln, thus retaining a large portion of the stresses produced.

Examples 9–50 show that the second general method of carrying out the invention involves determining from data on the properties of the material of the body to be strengthened whether the state of the material of the body can be changed to increase the volume, or whether a reaction product of another material and the material of the body has a greater volume than the reactants, and whether the changed state material or reaction product also has a lower coefficient of expansion than that of the body. If the conditions can be met, the body to be strengthened is then treated to change the surface layer to the changed state material or the reaction product is formed at the surface layer. When these steps are carried out at an elevated temperature, the cooling of the body after the treatment to form the changed state material or the reaction product will result in a surface layer with an expanded volume and which is also under compression due to the more rapid contraction of the body due to the difference in expansion coefficients.

It is not essential that the changed material of the surface layer of the reaction product of the surface layer which has the increased volume also have a lower coefficient of expansion than the material of the body. It is within the scope of the invention to form such a material which, while it has the same or a slightly larger coefficient of expansion than the material of the body, nevertheless has a volume which is sufficiently larger than the volume of the reactants from which it is produced that the net result is to form a surface layer which is under compression.

All of the foregoing examples deal with polycrystalline ceramic materials. However, single crystal ceramic materials are becoming more important, particularly with the development of methods to grow single crystal bodies in various forms. Laser crystals are all single crystals, and sapphire crystals have been used as envelopes for high intensity lamps, transparent armor, and light pipes, it being possible to grow them in many shapes with present day technology. It is therefore of importance to determine whether the strengthening methods useful for strengthening polycrystalline ceramic materials are also applicable to single crystal materials.

It has been found that the strength of single crystal ceramics can be improved by forming a compressive surface layer thereon. The following examples demonstrate that the methods described above with respect to polycrystalline materials are applicable to single crystal materials as well.

EXAMPLES 51–55

Groups of Linde sapphire rods 0.10" in diameter were prepared by centerless grinding, and were flame polished to remove surface flaws. The group of rods of Example 51 was packed in $CaCO_3$ and refired at 1350° C. for 3 hrs. The group of rods of Example 52 was packed in $Cr_2O_3$ and refired at 1500° C. for 1 hr. The groups of rods of Examples 53 and 54 were also packed in $Cr_2O_3$ and were fired at 3 hrs. at 1500° C. The group of rods of Example 55 was packed in 80% $Cr_2O_3$+20% $CrF_3$—½$H_2O$ and was refired at 1500° C. for 3 hrs.

The flexural strengths of the rods were determined by 3 point loading on a 1 inch span. The results for the various samples are presented in Table XI. The samples of Examples 52 and 55 were not oriented; that is, the plane determined by the c-axis and the rod axis was in a random position relative to the loading direction. In the remaining groups the samples were oriented by polarized light and then positioned in the loading fixture so that the c-axis was either in the same plane as the rod axis and the load vectors (0° orientation) or in a plane determined by the c-axis and the rod axis at a known angle (45° or 90°) to the plane determined by the rod axis and the load vectors.

Packing in $CaCO_3$ and refiring gave the best results, with an average flexural strength of 269,800 p.s.i. Packing in $Cr_2O_3$ and refiring also resulted in improved strengths, especially at the longer three hour firing time that, as indicated by a microprobe analysis, formed a thicker solid solution layer. Packing in the mixture of 80% $Cr_2O_3$+20% $CrF_3$.3—½$H_2O$ led to comparatively poor strengths in spite of the presence of a thick layer of $Cr_2O_3$ formed on the surface of the sapphire. This result tends to indicate that formation of the $Al_2O_3$—$Cr_2O_3$ solid solution is what produces the increased strength.

EXAMPLES 56–58

Groups of Linde Sapphire rods 0.10" in diameter were prepared as in Examples 51–55, and had mullite surface layers formed thereon. The group of rods of the examples were all packed in 600-mesh SiC, and the group of rods of Example 56 were refired for 8 hours at 1350° C., while the rods of Example 57 were fired at 1500° C. for 6 hours, and the rods of Example 58 were fired at 1650° C. for one hour.

The flexural strengths of the rods were determined for 0 orientation by three point loading on a 1 inch span, and the results for the various examples are presented in Table XII. The greatest strengthening effect was observed for rods refired at 1500° C. for six hours. Because of the difficulty in removing the crystals from the partially sintered silicon carbide packing material, these results may, in effect, represent the strengths of abraded samples, in which case the observed strength increases would be considered even more significant.

What is claimed is:

1. A method of increasing the bending strength and thermal shock characteristics of single crystal and polycrystalline ceramic bodies, comprising the steps of forming on at least one surface of the ceramic body and at an elevated temperature a layer of a low expansion material of a plurality of ceramic materials, one constituent of which is the material of the body, which low expansion material has a co-efficient of expansion which is less than that of the ceramic material of the body and the other constituent of the material being in a concentration decreasing from as high as 100% at the surface of the layer to 0% at a point at the surface of the body being strengthened, the layer having a thickness which is small relative to the thickness of the body, and then cooling the body sufficiently slowly to avoid thermal shock for producing on the surface of the body a layer which is under compression relative to the body.

2. A method as claimed in claim 1 in which the body is a metallic oxide polycrystalline body of $UO_2$ and the layer is a mixture taken from the system $UP_2O_7$—$UO_2$.

3. A method as claimed in claim 1 in which the body is a metallic oxide polycrystalline body of $TiO_2$ and the layer is a mixture taken from the system $TiO_2$—$P_2O_5$.

4. A method as claimed in claim 1 in which the body is a metallic oxide single crystal of $Al_2O_3$.

5. A method as claimed in claim 4 in which the layer is mullite.

6. A method as claimed in claim 4 in which the layer is at least one calcium aluminate.

7. A method as claimed in claim 4 in which the layer is a solid solution of $Cr_2O_3$ and $Al_2O_3$.

8. A method as claimed in claim 1 in which said low expansion material is a solid solution of a plurality of ceramic materials.

9. A method of increasing the bending strength and thermal shock characteristics of metallic oxide single crystal and polycrystalline ceramic bodies, comprising the steps of forming on at least one surface of the ceramic body and at an elevated temperature a coating of a low expansion solid solution of a plurality of metallic oxide ceramic materials one constituent of which is the matedial of the body, which solid solution has a coefficient of expansion which is less than that of the metallic oxide ceramic material of the body and the other constituent of the solid solution being in a concentration decreasing from as high as 100% at the surface of the layer to 0% at a point at the surface of the body being strengthened, the layer having a thickness which is small relative to the thickness of the body, and then cooling the body sufficiently slowly to avoid thermal shock for producing on the surface of the body a layer which is under compression relative to the body.

10. A method as claimed in claim 9 in which the body is a metallic oxide polycrystalline body of MgO, and the solid solution is a solid solution taken from the group consisting of MgO—NiO and MgO—CoO.

11. A method as claimed in claim 9 in which the body is a metallic oxide polycrystalline body of NiO, and the solid solution is a solid solution of NiO and MgO.

12. A method of increasing the bending strength and thermal shock characteristics of $TiO_2$ polycrystalline ceramic bodies comprising the steps of forming on at least one surface of the polycrystalline body and at an elevated temperature a coating of a low expansion solid solution taken from the group consisting of $TiO_2$—$SnO_2$ and $TiO_2$—$Cr_2O_3$ and which solid solution has a coefficient of expansion which is less than that of the $TiO_2$ of the body, and then cooling the body sufficiently slowly to avoid thermal shock, whereby there is produced on the coated surface of the body a layer which is under compression relative to the body.

13. A method as claimed in claim 4 in which said solid solution is $TiO_2$—$SnO_2$.

14. A method as claimed in claim 12 in which the solid solution is $TiO_2$—$Cr_2O_3$.

15. A method of increasing the bending strength and thermal shock characteristics of metallic oxide polycrystalline ceramic bodies comprising the steps of forming on at least one surface of a body which is a mixture of polycrystalline ceramic materials and at an elevated temperature a coating of a low expansion solid solution of a plurality of metallic oxide ceramic materials at least a part of which are the same as the materials of the body being strengthened and which is a reaction product of the material of the body, which solid solution has a coefficient of expansion which is less than that of the metallic oxide ceramic materials of the body and being in a concentration decreasing from as high as 100% at the surface of the coating to 0% at a point at the surface of the coated body, the coating having a thickness which is small relative to the thickness of the body, and then cooling the body sufficiently slowly to avoid thermal shock for producing on the coated surface of the body a layer which is under compression relative to the body.

16. A method as claimed in claim 15 in which the metallic oxide ceramic material of the body is $$MgO \cdot Al_2O_3$$

and the solid solution is a solid solution taken from the group consisting of an alumina rich $MgO \cdot Al_2O_3$ and $$MgO \cdot Al_2O_3—MgO \cdot Cr_2O_3.$$

17. A method as claimed in claim 15 in which the metallic oxide ceramic material of the body is 90% MgO—10% ZnO and the solid solution is a solid solution taken from the group consisting of MgO—NiO—ZnO and MgO—CoO—ZnO

18. A method of increasing the bending strength and thermal shock characteristics of single crystal and polycrystalline ceramic bodies, comprising the steps of forming on at least one surface of the ceramic body and at an elevated temperature a layer of a low expansion material which is a mixture of the material of the body and a further material having essentially the same chemical composition as the material of the body and having a changed crystalline phase from the crystalline phase of the material of the body and which has an increased volume and a coefficient of expansion which is less than that of the ceramic material of the body, the further material being in a concentration decreasing from as high as 100% at the surface of the layer to 0% at a point at the surface of the body being strengthened, the layer having a thickness which is small relative to the thickness of the body, and then cooling the body sufficiently slowly to avoid thermal shock for producing on the surface of the body a layer which is under compression relative to the body.

19. A method as claimed in claim 18 in which the ceramic body is stabilized zirconia and the layer of low expansion material is destabilized zirconia.

20. A method of increasing the bending strength and thermal shock characteristics of single crystal and polycrystalline ceramic bodies, comprising the steps of forming on at least one surface of the ceramic body and at an elevated temperature a layer of a low expansion material by reacting with the material of the body a reactant which is a ceramic material and which will react with the ceramic material of the body to form a reaction product which is a ceramic material having a volume which is greater than the sum of the volumes of the reactant and the ceramic material of the body involved in the reaction and a coefficient of expansion which is less than that of the ceramic material of the body, the reactant other than the material of the body being in a concentration decreasing from as high as 100% at the surface of the layer to 0% at a point at the surface of the body being strengthened, the layer having a thickness which is small relative to the thickness of the body, and then cooling the body sufficiently slowly to avoid thermal shock for producing on the surface of the body a layer which is under compression relative to the body.

21. A method as claimed in claim 20 in which the reaction product is a metallic oxide.

22. A method as claimed in claim 20 in which the ceramic body is alumina and the reaction product is at least one calcium aluminate.

23. A method as claimed in claim 20 in which the ceramic body is alumina and the reaction product is mullite.

24. A method as claimed in claim 20 in which the ceramic body is alumina and the reaction product has a spinel structure.

25. A ceramic body having increased bending strength and thermal shock characteristics comprising a body portion of ceramic material and a layer of material which is under compressive stress as compared to the stress in the body portion on at least one surface of said body portion, said material of said layer being a low expansion material having a coefficient of expansion which is less than that of the ceramic material of the body portion and being composed of a plurality of ceramic materials, at least one of which is the material of the body portion and at least one further ceramic material, the further ceramic material being in a concentration decreasing from as high as 100% at the surface of the layer to 0% at a point at the surface of the body being strengthened, the layer having a thickness which is small relative to the thickness of the body.

26. A ceramic body as claimed in claim 25 in which the body portion is a single crystal.

27. A ceramic body as claimed in claim 26 in which said material of said layer is a solid solution of a plurality of ceramic materials, one of which is the ceramic material of said body portion.

28. A ceramic body as claimed in claim 27 in which the body is $Al_2O_3$ and the solid solution is $Cr_2O_3$—$Al_2O_3$.

29. A ceramic body as claimed in claim 25 in which the layer is at least one calcium aluminate.

30. A ceramic body as claimed in claim 26 in which the material of the layer is mullite.

31. A ceramic body as claimed in claim 25 in which the body portion is a polycrystalline ceramic.

32. A ceramic body as claimed in claim 31 in which said material of said layer is a solid solution of a plurality of ceramic materials, one of which is the ceramic material of said body portion.

33. A cermic body as claimed in claim 32 in which said polycrystalline body portion is of a metallic oxide ceramic material and the ceramic materials of said solid solution are metallic oxide ceramic materials.

34. A ceramic body as claimed in claim 33 in which the polycrystalline body portion is $TiO_2$ and the said solid solution is taken from the group consisting of $TiO_2$—$SnO_2$ and $TiO_2$—$Cr_2O_3$.

35. A ceramic body as claimed in claim 33 in which said polycrystalline body portion is MgO and the solid solution is a solid solution taken from the group consisting of MgO—NiO and MgO—CoO.

36. A polycrystalline body as claimed in claim 33 in which said polycrystalline body portion is NiO and the solid solution is a solid solution of MgO and NiO.

37. A polycrystalline body as claimed in claim 32 in which said polycrystalline body portion is a plurality of metallic oxide ceramic materials and the ceramic materials of said solid solution are a plurality of metallic oxide ceramic materials.

38. A polycrystalline body as claimed in claim 37 in which said polycrystalline body portion is $Mgo.Al_2O_3$ and the solid solution is a solid solution taken from the group consisting of an alumina rich $MgO.Al_2O_3$ and $MgO.Al_2O_3$—$MgO.Cr_2O_3$.

39. A polycrystalline body as claimed in claim 37 in which said polycrystalline body portion is 90% MgO—10% ZnO and the solid solution is a solid solution taken from the group consisting of MgO—NiO—ZnO and MgO—CoO—ZnO.

40. A ceramic body as claimed in claim 31 in which said polycrystalline body portion is $UO_2$ and the material of said layer is a mixture taken from the system $UP_2O_7$—$UO_2$.

41. A ceramic body as claimed in claim 31 in which said polycrystalline body portion is $TiO_2$ and the material of said layer is a mixture taken from the system $TiO_2$—$P_2O_5$.

42. A ceramic body having increased bending strength and thermal shock characteristics comprising a body portion of ceramic material and a layer of material which is under compressive stress as compared to the stress in the body portion on at least one surface of said body portion, said material of said layer being a low expansion material having a coefficient of expansion which is less than that of the ceramic material of the body portion and having the same composition of the material of the body portion but being a different crystalline phase which has a larger volume than the same amount of material of the body portion, the different crystalline phase ceramic material being in a concentration decreasing from as high as 100% at the surface of the layer to 0% at a point at the surface of the body being strengthened, the layer having a thickness which is small relative to the thickness of the body.

43. A ceramic body as claimed in claim 42 in which the material of the body portion is stabilized zirconia and the material of the layer is destabilized zirconia.

44. A ceramic body having increased bending strength and thermal shock characteristics comprising a body portion of ceramic material and a layer of material which is under compressive stress as compared to the stress in the body portion on at least one surface of said body portion, said material of said layer being a low expansion material having a coefficient of expansion which is less than that of the ceramic material of the body portion and being a reaction product which is a ceramic material, which reaction product is the product of a reaction between a reactant which is a ceramic material and the material of the body portion and which reaction product has a volume which is greater than the sum of the volumes of the reactant and the ceramic material of the body which is involved in the reaction, the reactant being in a concentration decreasing from as high as 100% at the surface of the layer to 0% at a point at the surface of the body being strengthened, the layer having a thickness which is small relative to the thickness of the body.

45. A ceramic body as claimed in claim 44 in which the material of said body portion is alumina and the material of said layer is a mixture of calcium aluminates.

46. A ceramic body as claimed in claim 44 in which the material of said body is alumina and the material of said layer is mullite.

47. A ceramic body as claimed in claim 44 in which the material of said body is alumina and the material of said layer has a spinel structure.

48. A method of increasing the bending strength and thermal shock characteristics of single crystal and polycrystalline ceramic bodies, comprising the steps of forming on at least one surface of the ceramic body a layer of material by reacting with the material of the body a reactant which is a ceramic material and which will react with the ceramic material of the body to form a reaction product which is ceramic material having a volume which is greater than the sum of the volumes of the reactant and the ceramic material of the body which is involved in the reaction, the reactant other than the material of the body being in a concentration decreasing from as high as 100% at the surface of the layer to 0% at a point at the surface of the body being strengthened, the layer having a thickness which is small relative to the thickness of the body and being under compression relative to the body.

49. A ceramic body having increased bending strength and thermal shock characteristics comprising a body portion of ceramic material and a layer of material which is under compressive stress as compared to the stress in the body portion on at least one surface of said body portion, said material of said layer being a reaction product which is a ceramic material, which reaction product is the product of a reaction between a reactant which is a ceramic material and the material of the body portion and which reaction product has a volume which is greater than the sum of the volumes of the reactant and the ceramic material of the body which is involved in the reaction, the reactant being in a concentration decreasing from as high as 100% of the surface of the layer to 0% at a point at the surface of the body being strengthened, the layer having a thickness which is small relative to the thickness of the body.

References Cited

UNITED STATES PATENTS

| | | | |
|---|---|---|---|
| 3,228,548 | 1/1966 | Butler ------------ | 117—123 A |
| 3,619,240 | 11/1971 | Lodelinsart et al. -- | 117—123 A |

FOREIGN PATENTS

| | | | |
|---|---|---|---|
| 254,225 | 9/1964 | Australia ------------ | 117—124 |

RALPH S. KENDALL, Primary Examiner

W. F. CYRON, Assistant Examiner

U.S. Cl. X.R.

117—121, 169 R